US006456471B1

(12) United States Patent
Haun et al.

(10) Patent No.: US 6,456,471 B1
(45) Date of Patent: Sep. 24, 2002

(54) TEST, RESET AND COMMUNICATIONS OPERATIONS IN AN ARC FAULT CIRCUIT INTERRUPTER WITH OPTIONAL MEMORY AND/OR BACKUP POWER

(75) Inventors: Andy A. Haun, Cedar Rapids, IA (US); Brian G. Grattan, Cedar Rapids, IA (US); Kon B. Wong, Cedar Rapids, IA (US); Robert F. Dvorak, Mt. Vernon, IA (US); Gary W. Scott, Mount Vernon, IA (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/466,362

(22) Filed: Dec. 17, 1999

Related U.S. Application Data

(63) Continuation-in-part of application No. 09/129,685, filed on Aug. 5, 1998, now Pat. No. 6,259,996, which is a continuation-in-part of application No. 09/026,193, filed on Feb. 19, 1998, now Pat. No. 6,246,556.

(51) Int. Cl.[7] ................................................. H02H 3/00
(52) U.S. Cl. ........................................................ 361/42
(58) Field of Search ...................... 361/42–50; 324/520, 324/522, 536, 613; 702/58, 64, 66, 69

(56) References Cited

U.S. PATENT DOCUMENTS

| 5,185,684 A | * | 2/1993 | Beihoff et al. ................. 361/45 |
| 5,223,795 A | | 6/1993 | Blades ........................ 324/536 |
| 5,452,222 A | | 9/1995 | Gray et al. ................... 364/481 |
| 5,537,327 A | | 7/1996 | Snow et al. .................. 364/483 |
| 5,847,913 A | * | 12/1998 | Turner et al. ................... 361/42 |
| 5,875,087 A | * | 2/1999 | Spencer et al. ................ 361/87 |
| 5,963,406 A | * | 10/1999 | Neiger et al. .................. 361/42 |
| 6,031,699 A | | 2/2000 | Dollar, II et al. ............ 361/142 |
| 6,040,967 A | | 3/2000 | DiSalvo ....................... 361/142 |
| 6,052,046 A | | 4/2000 | Ennis et al. ................. 335/202 |
| 6,084,756 A | | 7/2000 | Doring et al. ................. 361/45 |
| 6,191,589 B1 | | 2/2001 | Clunn ........................ 324/424 |
| 6,198,611 B1 | | 3/2001 | Macbeth ....................... 361/42 |
| 6,215,378 B1 | | 4/2001 | Gibson et al. ................. 335/18 |
| 6,229,679 B1 | | 5/2001 | Macbeth ....................... 361/42 |
| 6,229,680 B1 | | 5/2001 | Shea ........................... 361/42 |
| 6,232,857 B1 | | 5/2001 | Mason, Jr. et al. ........... 335/18 |

FOREIGN PATENT DOCUMENTS

| CA | 2267490 | 3/1999 | ............ H02H/3/00 |
| CA | 2256208 | 6/1999 | ............ H01H/9/50 |
| CA | 2256243 | 6/1999 | ............ H02H/3/16 |
| CA | 2277589 | 6/1999 | ............ H02H/3/16 |
| CA | 2265204 | 12/1999 | .......... H01H/83/00 |
| CA | 2305910 | 10/2000 | .......... H01H/71/04 |
| CA | 2307812 | 11/2000 | .......... H01H/83/00 |
| EP | 0974995 A2 | 1/2000 | .......... H01H/71/02 |
| EP | 0981193 A2 | 2/2000 | ............ H02H/1/00 |
| EP | 1005129 | 5/2000 | ............ H02H/1/00 |
| WO | WO92/08143 | 5/1992 | .......... G01R/31/00 |
| WO | WO00/11696 | 3/2000 | .......... H01H/73/00 |
| WO | WO00/36623 | 6/2000 | ............ H02H/1/00 |
| WO | WO00/39771 | 7/2000 | .......... G08B/21/00 |
| WO | WO01/01536 A1 | 1/2001 | ............ H02H/3/00 |

OTHER PUBLICATIONS

JP 06308191, dated Apr. 11, 1994, Abstract.

* cited by examiner

Primary Examiner—Ronald W. Leja
(74) Attorney, Agent, or Firm—Kareem M. Irfan; Larry I. Golden (57) ABSTRACT

An arc fault circuit interrupter system for use with an electrical circuit includes an arcing fault detector which monitors the electrical circuit and a controller which generates a trip signal in response to the detection of arcing faults. The controller may also generate one or more communication signals corresponding to information relating to the operation of the arcing fault circuit interrupter. The system may also include one or more of the following: a communication port which communicates to a user the information relating to operation of the arc fault circuit interrupter in response to the communication signals; a memory for retaining predetermined information related to the condition and operation of the arcing fault circuit interrupter, with or without a backup memory; and a combined self-test/reset switch.

45 Claims, 7 Drawing Sheets

TEST, RESET AND COMMUNICATIONS OPERATIONS IN AN ARC FAULT CIRCUIT INTERRUPTER WITH OPTIONAL MEMORY AND/OR BACKUP POWER

CROSS REFERENCE TO RELATED APPLICATIONS

This application is a continuation-in-part of application Ser. No. 09/129,685, filed Aug. 5, 1998, now U.S. Pat. No. 6,259,996, which is a continuation-in-part of application Ser. No. 09/026,193, filed Feb. 19, 1998, now U.S. Pat. No. 6,246,556, and is also a continuation-in-part of said application Ser. No. 09/026,193, filed Feb. 19, 1998, now U.S. Pat. No. 6,246,556.

FIELD OF THE INVENTION

The present invention relates to the protection of electrical circuits and, more particularly, to the detection of electrical faults of the type known as arcing faults in an electrical circuit and more particularly still to test, reset and communications operations in an arc fault circuit interrupter with memory and/or backup power

BACKGROUND OF THE INVENTION

The electrical systems in residential, commercial and industrial applications usually include a panel board for receiving electrical power from a utility source. The power is then routed through protection devices to designated branch circuits supplying one or more loads. These overcurrent devices are typically circuit interrupters such as circuit breakers and fuses which are designed to interrupt the electrical current if the limits of the conductors supplying the loads are surpassed.

Circuit breakers are a preferred type of circuit interrupter because a resetting mechanism allows their reuse. Typically, circuit breakers interrupt an electric circuit due to a disconnect or trip condition such as a current overload or ground fault. The current overload condition results when a current exceeds the continuous rating of the breaker for a time interval determined by the trip current. A ground fault trip condition is created by an imbalance of currents flowing between a line conductor and a neutral conductor which could be caused by a leakage current or an arcing fault to ground.

Arcing faults are commonly defined as current through ionized gas between two ends of a broken conductor or at a faulty contact or connector, between two conductors supplying a load, or between a conductor and ground. However, arcing faults may not cause a conventional circuit breaker to trip. Arcing fault current levels may be reduced by branch or load impedance to a level below the trip curve settings of the circuit breaker. In addition, an arcing fault which does not contact a grounded conductor or person will not trip a ground fault protector.

There are two types of arcing faults in electrical circuits and wiring: Parallel and Series.

Parallel arcing occurs when there is an arc between two wires or wire-to-ground and the current is limited by the impedance of the voltage source, the wire, and the arc. When the fault is solidly connected and the arc voltage low, the normal breaker trips very quickly with little heating of the wire or damage at the arc point. Occasionally, however, the arc blows apart the faulted components creating a larger arc voltage and reducing the fault current below the trip curve and causing "ticking faults." The consequences of parallel arc damage, are usually much greater than series arcs. The average current may not be sufficient to trip a conventional breaker by heating the bimetal strip or the peak current may not be large enough to trigger the magnetic trip latch. This makes the conventional breaker reasonably effective in protecting against parallel arcing when the peak current is a few hundred amps. Unfortunately, the fault current can be limited by a circuit with too much impedance to immediately trip the thermal-magnetic breaker. Parallel arcing is generally more hazardous than series arcing. The energy released in the arc is much higher with temperatures often in excess of 10,000 Deg. F. This causes pyrolyzation or charring of the insulation, creating conductive carbon paths and ejecting hot metal that can encounter flammable materials.

Series arcing begins with corrosion in pin-socket connections or loose connections in series with the electrical loads. The voltage drop across a poor connection begins at a few hundred millivolts and slowly heats and oxidizes or pyrolizes the surrounding materials. The voltage drop increases to a few volts at which time it becomes a "glowing connection" and begins to release smoke from the surrounding polymer insulation. Series arc current is usually limited to a moderate value by the impedance of the electrical load that is connected to the circuit. The amount of power from series arc is typically far is less than in a parallel arc fault. Since the peak current is typically never greater than the design load current, series arcing is much more difficult to detect than parallel arcing. The signature of the series arc is an unusual variation of the normal load current. Series arcing is usually such that the arc current remains well below the trip curve of the breaker. Loose terminal lugs, misarranged or cross-threaded electrical plugs, broken conductor strands inside a wire are typical sources. These arcs cause load voltage drops and heating of the wire, plug pin, or terminal lug. This heating can lead to component failure and ignition sources.

There are many conditions that may cause an arcing fault. For example, corroded, worn or aged wiring, connectors, contacts or insulation, loose connections, wiring damaged by nails or staples through the insulation, and electrical stress caused by repeated overloading, lightning strikes, etc. These faults may damage the conductor insulation and cause the conductor to reach an unacceptable temperature.

Standard overcurrent devices used in circuit breakers respond to the heating effect of current in a resistive wire to "thermal trip" the breaker, but these do not respond to the sputtering arc currents. We propose a better approach—to stop the arc when it happens rather than wait for a circuit breaker to thermal trip. Until recently, such arc detection capability has not been available in circuit breakers or relays. Ground Fault Circuit Interrupters (GFCI) for personnel protection have been available in the home since the early 1970's. Under ideal conditions, GFCI can detect phase to ground arcs as low as six milliamps, but cannot detect series arcs or improve line to neutral fault trip times.

Arc Fault detection technologies are a new and exciting innovation in circuit protection in the U.S. We have found that Arc Fault Circuit Interrupters (AFCI) can be designed to detect a series or parallel arc, as well as line to neutral arcs by "listening" for the unique signatures which arcs generate. An arc fault circuit interrupter is a device intended to provide protection from the effects of arc faults by recognizing characteristics unique to arcing and by functioning to de-energize the circuit when an arc fault is detected.

Conventional circuit breakers have historically been the best available protection for wiring. Today's design standards are based on technologies that are up to 40 years old. In circuit breakers, the protection is usually provided in two ways. Short circuit currents operate a magnetic trip latch, while overload currents operate either a bimetal trip latch or hydraulic damped magnetic plunger. The "instantaneous trip" is the high current magnetic trip action found on some but not all breakers. The time to trip during an overload is determined by the time it takes to heat a bimetal to the temperature that delatches the breaker. The more current that heats the bimetal, the shorter the time it takes to trip the breaker. A hydraulic-magnetic style of breaker contains a magnetic slug sealed in fluid which moves to a trip position in response to the square of the current. These circuit interruption devices are selected by design engineers to protect the wiring from overheating or melting. During arcing faults these currents are often small, short in duration and well below the over current time protection curve designed into these breakers.

Arcing in a faulted AC circuit usually occurs sporadically in each half cycle of the voltage waveform. The complex arcing event causes sputtering arc's that vary the current from normal load patterns. The precursor to the arc may be a high resistance connection leading to a "glowing contact" and then a series arc, or a carbon track leading to line-to-line or parallel arcing. In a home circuit breaker equipped with Ground Fault Circuit Interrupter (GFCI), a carbon or moisture track can be detected early if the short is to ground. With the introduction of AFCI breakers, protection of arcing shorts from line-to-line, not involving ground, can also be detected and interrupted.

In our arc fault interrupter, the additional electronic devices monitor both the line voltage and current "signatures." In a normal operating circuit, common current fluctuations produce signatures which should not be mistaken for an arc. Starting currents, switching signatures and load changes (normal or "good arc" events) can be digitally programmed in the AFCI as normal signatures waveforms. Deviations or changes from these "normal" signatures are monitored by electronic circuits and algorithms to determine if arcing is occurring. When these arc fault signatures are recognized, the circuit is interrupted and power is removed. The speed of this detection as well as the arc magnitude can be programmable parameters at the time of manufacture. The particular signatures identified as arcs are part of the proprietary arc fault technology of Square D Company.

Commercial, UL approved AFCI circuit breakers are available commercially. These are now in the NEC and will be required in home bedroom circuits in 2002. Since the electrical loads in residential circuits can vary widely, they will be designed to allow for almost an infinite combination of electrical loads. Their AFCI programming will be combined with GFCI as well as magnetic and thermal overload components. They will be designed to form fit and function in place of standard residential circuit breakers.

Summarizing briefly, heat, arcs or electrical ignition are often caused by loose connections, broken or shorted wires in the power distribution system. In wiring, vibration, moisture temperature extremes, improper maintenance and repair all contribute to wiring failure. This leads to arcing and may ignite combustible components. Furthermore, carbon tracking caused by heat generated by the arc can deteriorate the wire insulation, exposing the conductors and resulting in intermittent short circuits between individual wires. These inter-wire shorts can cause damage and malfunctions. Elimination or reduction of these hazards with arc fault technology should become an industry-wide priority.

OBJECTS AND SUMMARY OF THE INVENTION

It is a general object of the present invention to provide an improvement in an arc fault interrupter system which reliably detects arc fault conditions which may be ignored by conventional circuit interrupters.

A more specific object is to provide one or more of test, reset and communications capabilities, memory and/or back-up power for an arc fault detection system such as an arc fault interrupter.

Another object of the invention is to provide an arc fault interrupter system which utilizes a minimum number of highly reliable electronic components, so as to be relatively simple and yet highly reliable in operation.

Other and further objects and advantages of the invention will be apparent to those skilled in the art from the present specification taken with the accompanying drawings and appended claims.

In accordance with one aspect of the invention, there is provided an arc fault circuit interrupter system for use with an electrical circuit, and comprising an arcing fault detector which monitors said electrical circuit and a controller which generates a trip signal in response to the detection of arcing faults, said controller also generating one or more communication signals corresponding to information relating to the operation of the arcing fault circuit interrupter, and a communication port which communicates to a user the information relating to operation of the arc fault circuit interrupter in response to the communication signals.

In accordance with another aspect of the invention, there is provided an arc fault circuit interrupter system for use with an electrical circuit, and comprising an arcing fault detector which monitors said electrical circuit and a controller generates a trip signal in response to the detection of arcing faults, a reset switch, a self-test switch, and a single user-accessible control element adapted to selectively activate one or both of said reset switch and said self-test switch.

In accordance with another aspect of the invention, there is provided an arcing fault circuit interrupter system for use with an electrical circuit, and comprising an arc fault detector which monitors said electrical circuit and a controller which generates a trip signal in response to the detection of arcing faults, and a memory for retaining predetermined information related to the condition and operation of the arcing fault circuit interrupter, said memory being operatively coupled with said controller.

DESCRIPTION OF ILLUSTRATIVE EMBODIMENTS

Figure 1:
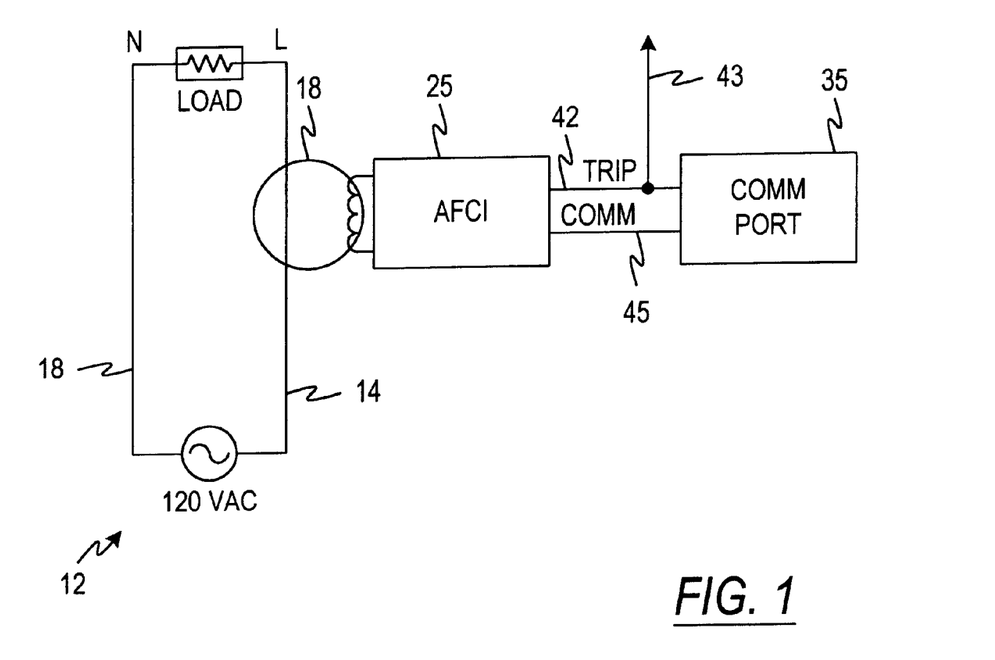
FIG. 1 is a simplified block diagram of one embodiment of an arc fault detection system embodying the invention.

Referring now to the drawings and initially to FIG. 1, an arcing fault detection system in accordance with one embodiment of the invention is illustrated in functional block form. A 120 volt AC circuit 12 has a line conductor 14 and a neutral conductor 18. A sensor 16, which may be in the form of a di/dt coil is associated with the line conductor 14 and feeds an output signal to an arcing fault detection circuit or arc fault circuit interrupter (AFCI) 25. The AFCI circuit 25 has respective trip 42 and communications 45 outputs which are coupled with a communications port 35. The trip output 42 may also be coupled to directly or indirectly activate or trip a circuit interruption device for interrupting the current flow in the 120 VAC circuit 12 when an arcing fault is detected, as indicated by reference numeral 43.

Figure 2:
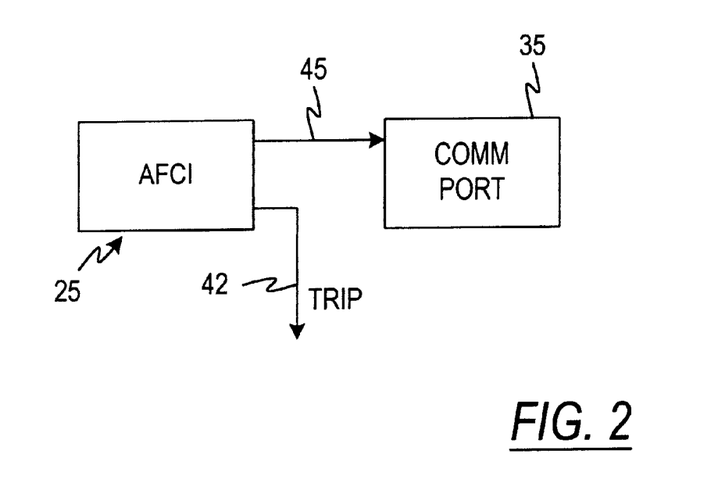
FIG. 2 is a simplified diagram of another embodiment of an arc fault detection system in accordance with the invention.

The communication port 35, as shown in FIG. 2, may alternately receive only the communications signals from the AFCI 25 in which case the communications line 45, in addition to other information as described below, would also deliver a suitable signal to the communication port 35 indicating when the trip signal has been given on the trip signal output 42.

Figure 3:
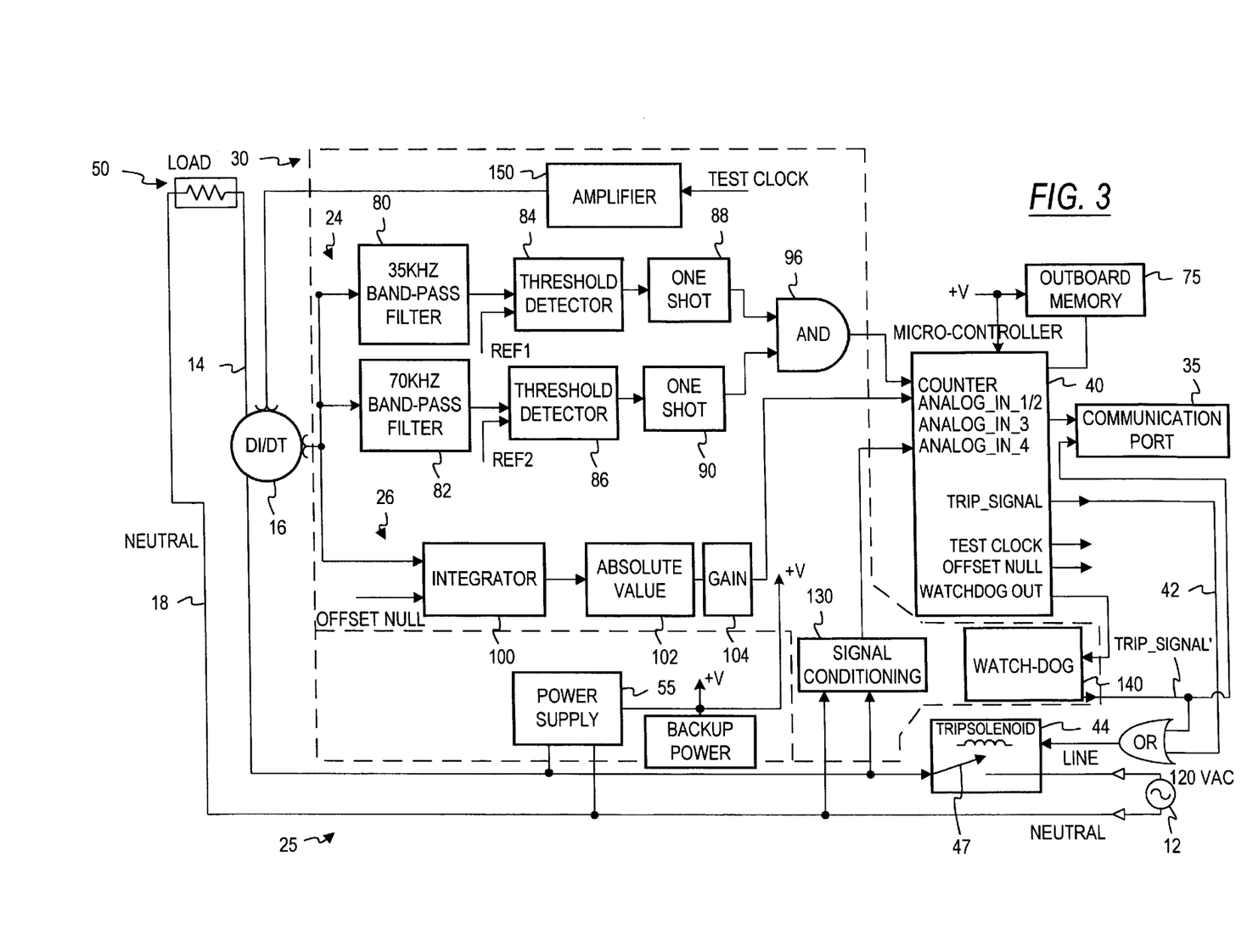
FIG. 3 is a functional block diagram of an arc fault detecting system showing additional details of one embodiment of arc fault detection circuitry.

Referring next to FIG. 3, there is shown in block form further details of the AFCI circuit 25. The di/dt sensor 16 may comprise a toroidal coil having an annular core which surrounds the line conductor 14, with a toroidal sensing coil wound helically on the core. In the sensor 16, the core may be made of magnetic material such as ferrite, iron or molded permeable powder, such that the sensor is capable of responding to rapid changes in flux. An air gap may be cut into the core in certain instances to reduce the permeability, and the core material is such that it does not saturate during the relatively high current produced by some forms of arcing, so that arc detection is still possible.

The di/dt sensor 16 provides an input to an arcing fault detector circuit 24 which in this embodiment includes a broadband noise detector circuit and a current fault detector circuit 26 which in this embodiment is a current measuring circuit. In the illustrated embodiment, all of the components of the an arcing fault circuit detector 24 and the current fault detector circuit 26, as well as some other circuit components to be described later, are provided on an application specific integrated circuit (ASIC) 30. Suitable output signals from the ASIC 30 are fed to a microcontroller 40 which, based on analysis and further processing of the signals provided by the ASIC 30 makes a decision as to whether to send a trip signal to an output 42 for activating a trip circuit 44 which will in effect switch the line side conductor 14 of the 120 VAC circuit 12 to an open circuit condition as indicated diagrammatically in FIG. 3, or whether to allow the line side 14 of the circuit 12 to remain connected to a load 50.

Referring still to FIG. 3, additional components of the ASIC 30 will next be described.

The broadband noise detector 24 comprises first and second band-pass filter circuits 80, 82 which receive the rate of change of current signal from the di/dt sensor 16. In accordance with the invention, the band passes of these circuits 80 and 82 are selected at frequency bands which are representative of broadband noise typical of arcing faults and/or so as to substantially (statistically) eliminate signals at frequencies which may occur on the line which do not represent, that is are not due to, an arcing fault. In the illustrative embodiment, these band-pass frequencies are selected as typically 35 kilohertz and 70 kilohertz respectively. Each of the band-pass filter circuits 80 and 82 feeds a filtered signal, comprising those components of an input signal from the di/dt sensor which fall within their respective band-pass frequency bands, to respective threshold detector circuits 84 and 86.

The threshold detectors 84 and 86 are responsive to those components of the frequency signals passed by the band-pass filters 80 and 82 which are above a predetermined threshold amplitude for producing a corresponding frequency amplitude output to signal conditioning circuits 88 and 90. These circuits 88 and 90 produce a conditioned output signal in a form suitable for input into the microcontroller 40. In the illustrative embodiment, these latter signal conditioning circuits 88 and 90 comprise ten microsecond one-shot circuits for producing a unit pulse signal. The output pulses generated by the one-shots 88 and 90 are ANDed at an AND circuit 96 whose output is fed to a "counter" input of the microcontroller 40 as indicated in FIG. 3. In the illustrative embodiment, a one volt threshold is utilized by both of the threshold circuits 84 and 86.

Referring still to FIG. 3, the current fault sensor or current measuring portion 26 of the ASIC 30 also receives the output signal of the di/dt sensor 16. An integrator circuit 100 develops a signal representative of current magnitude in response to the output of the di/dt sensor 16. This signal is fed to a further signal conditioning circuit portion 102 which includes an absolute value circuit as shown in FIG. 2 and a gain circuit 104 for producing a conditioned current output signal in a form suitable for input to the controller 40.

The absolute value circuit 102 takes signals that are both negative- and positive-going and invert any negative going signals to positive signals while passing through positive-going signals unchanged.

The output of the absolute value circuit 102 is fed into the gain circuit 104 which in one embodiment includes a low current gain stage and a high current gain stage. Briefly, the low current gain stage applies a relatively greater amount of gain to relatively low currents so as to increase the resolution of the current signal for relatively low current levels. On the other hand, the high current gain stage applies a relatively lower gain to relatively higher current levels in order to maintain a full range of current signal levels through the circuit. The outputs of the respective low current and high current gain stages are fed to the microcontroller 40.

The line voltage is also conditioned at a circuit 130 and fed to the microcontroller for further analysis and processing. This circuit 130 includes a line voltage divider (not shown) which divides the line voltage to a lower level suitable for further processing, a difference amplifier (not shown) which takes the output of the line voltage divider and level shifts it to circuit ground to be rectified, and an absolute value circuit. The voltage from the difference amplifier (not shown) is fed through an absolute value circuit (not shown) which has the same configuration and function as described above for the previously described absolute value circuits. The output of signal conditioning circuit 130 is fed to the microcontroller 40.

Referring still to FIG. 3, a watchdog circuit 140 takes a pulse input (Pulse_In) from the microcontroller 40 to check to see if the microcontroller is still active. If no pulses are present on this output from the microcontroller then a trip signal (Trip_Signal') is sent to the trip circuit by the watchdog circuit 140.

A "push to test" amplifier circuit 150 receives a "test clock" signal from the microcontroller when a "push to test" switch (not shown) is actuated and conditions it for input to a test winding on the di/dt sensor 16. If all of the circuitry operates properly, the microcontroller should receive back signals indicating an arcing fault. In accordance with a test program when these signals are received, the microcontroller will produce a "trip" signal on line 42.

signals received from the ASIC 30. Table 1 summarizes high current arcing characteristic of current waveforms and how firmware counters are incremented. A detailed description of how the counters are used to determine if an arc is present is described later.

Conditions exist where loads have broadband noise, large (di/dt) and high currents under normal operating conditions. To distinguish between normally noisy load currents and arcing currents, the algorithms looks for different levels of (di/dt) broad band noise, high currents, decaying currents and current aspect ratios*.

Broadband noise is calculated as logically anding two or more frequency bands in hardware as described above. If broadband noise is present then pulses are received at the microcontroller input. The pulses are counted every half cycle, stored and then reset to detect broadband noise levels in the next half cycle.

TABLE 1

(each row characterizes an arcing half cycle)

| peak current with aspect ratio* > 2 | (di/dt) (dt** = 500 us) | high frequency broad band noise*** | high current arc counter | (di/dt) count | high frequency counter |
|---|---|---|---|---|---|
| >48A | >0.328xpeak current | not required | increment | increment | unchanged |
| >48A | >0.328xpeak current | present | increment | increment | increment |
| >48A | >0.203xpeak current | required | increment | unchanged | increment |
| >48A | >0.25xpeak current | required | increment | increment | increment |

*Aspect ratio is the area divided by the peak for one half cycle. Area is the sum of 32 samples for one half cycle.
**dt is the time between every other sample of the current waveform. This sample time varies dynamically with the line frequency (60 ± 4 Hz) to get better coverage of the current waveform.
***High frequency broadband noise is the presence of broadband noise during the first 20 half cycles on power-up of the module with a load connected and turned on, and normal operation due to noisy loads at steady state (currents below 48Apeak).

As indicated above, FIG. 3 illustrates one embodiment of an application specific integrated circuit for performing the above-described operations. Further details of the construction and operation of the circuit of FIG. 3 are described in the above-referenced copending application, Ser. No. 09/026,193, filed Feb. 19, 1998 (attorney's docket NBD27/SQRE020), which has been incorporated by reference.

Provision of the detector circuit as an ASIC is advantageous, in that it permits the circuitry to be readily incorporated into a variety of environments. This is mainly due to the small size and relatively modest power requirements of the ASIC. That is, this detector circuit can be incorporated not only in panel boards or other distribution apparatus, but could also be located at individual loads. This is true for industrial, as well as and commercial and residential applications. For example, the detector circuit ASIC could be incorporated in electrically powered industrial and/or commercial equipment or machinery, as well as in consumer products such as computers, audiovisual equipment, appliances or the like.

The microcontroller 40 analyzes current waveforms and broadband noise to determine if arcing is present in electrical conductors. A high current arc is identified as a current waveform that has a combination of changes in current (di/dt) and broadband noise (10 kHz to 100 kHz). The controller 40 increments a plurality of counters, which may be implemented in software, in accordance with the input A block diagram of a typical application for a residential arc fault circuit breaker is shown in FIG. 3. Arcing and startup current waveforms are analyzed by the controller using the algorithms described in the following description.

The firmware contains the following counters and other variables:

di/dt1 (holds the maximum di/dt one half cycle ago)
di/dt2 (holds the maximum di/dt two half cycles ago)
di/dt3 (holds the maximum di/dt three half cycles ago)
di/dt4 (holds the maximum di/dt four half cycles ago)
di/dt_counter (holds the integer number of times di/dt count has been incremented, specified in TABLE 1)
peak1 (holds the peak current of one half cycle ago)
peak2 (holds the peak current of two half cycle ago)
peak3 (holds the peak current of three half cycle ago)
peak4 (holds the peak current of four half cycle ago)
peak5 (holds the peak current of five half cycle ago)
high_current_arc_counter (holds the integer number of times an arcing half cycle was detected from TABLE 1)
high_frequency_counter (holds the integer number of counts of high frequency of the previous half cycles)
high_frequency_noise_counter (holds the integer number of high frequency counts during startup or steady state (currents less then 48A))

missing_half cycle (true when nonarcing half cycle follows arcing half cycle)

slow_rise (holds the value of peak1—di/dt1)

peak_ground_fault (holds the peak ground fault current of last half cycle)

The counters described above are incremented and cleared in the following way:

If (peak1>48A) then check the following:

If (di/dt1>(0.328×peak1) and high_frequency_counter>4 and high frequency noise counter<16)

increment di/dt_counter increment high_frequency_counter increment high_current_arc_counter ElseIf (di/dt1>(0.328×peak1))

increment di/dt_counter increment high_current_arc_counter

ElseIf (di/dt1>(0.25×peak1) and high_frequency_counter>4 and high_frequency_noise counter<16)

increment di/dt_counter increment high_frequency_counter increment high_current_arc_counter ElseIf (di/dt1>(0.203×peak1) and high_frequency_counter>4 and high frequency noise counter<16)

increment high_frequency_counter increment high_current_arc_counter

If no arcing half cycle in 0.5 seconds after last arcing half cycle, then clear all counters A line to neutral arc or ground fault arc is present under the following conditions of the above firmware counters:

If (ground fault>threshold)

If (peak currents>35A for 3 half cycles and missing_half cycle is true and di/dt_counter>1 and high_current_arc_counter>1)

If (peak currents>35A for 4 half cycles and missing_half cycle is true and high current_arc_counter>2)

If (peak currents>35A for 5 half cycles and missing_half cycle is true and high_current_arc_counter>3)

If (peak currents>35A for 5 half cycles and high current_arc_counter>3 and di/dt1>di/dt3 and di/dt_counter>2)

If (peak currents>35A for 5 half cycles and high_current_arc_counter>3 and di/dt1>di/dt3 and high_frequency_counter>2 and di/dt_counter>1)

If (peak currents>35A for>5 half cycles and <9 half cycles and high_current_arc_counter>3 and missing_half cycles is true)

If (peak currents>35A for >5 half cycles and <9 half cycles and high_current_arc_counter>3 and di/dt_counter>3)

If (peak currents>35A for >5 half cycles and <9 half cycles and high_current_arc_counter>3 and high_frequency_counter>1 and di/dt_counter>2)

If (peak currents>35A peak for >5 half cycles and <9 half cycles and high_current_arc_counter>3 and high_frequency_counter>2 and di/dt_counter>1)

If (high_current_arc>6)

Start-up Algorithms:

If (peak1 to peak4>35A and missing_half cycle=false) then check the following:

If (((peak1<(peak3−7A)) and (peak1<peak2)) and ((peak2<peak3) and (peak2<peak4−7A)))

tungsten lamp startup, clear the following counters high current_arc_counter di/dt_counter high_frequency_counter ElseIf((peak3>peak1) and (peak5>peak3) and (di/dt1<peak1/2) and (di/dt2<peak2/2) and (di/dt3<peak3/2) and ((di/dt5+1.4A)>=di/dt3) and ((di/dt3+1.4A>=di/dt1) and (slow_rise1>48A))

inductive load startup, clear the following counters di/dt_counter high_frequency_counter Note: The numerical values in the above expressions are selected for residential applications. However, specific numerical values, current levels and counter values are not limited to the above specifications, but may vary for other applications. Also, the invention is not limited to the above-described embodiments of the ASIC 30 and controller 40.

Referring now to FIGS. 4–8, the communication port 35 may take a number of forms. In one embodiment, the communication port 35 may comprise a wireless, line-of-sight signaling device such as an LED (visible light or IFR) or other optical (or IFR) device. For example, the LED could be energized in various fashions by the communications signal 45 to indicate the condition of the AFCI 25, for example standby, tripped, self-test passed, and self-test failed. This might be indicated by different patterns of flashing of the LED, by the LED being left on steadily, by different brightness conditions or the like. Alternatively, a bicolor or a multiple color LED could be used to indicate various conditions for example standby (green), tripped (red), self-test passed (flashing green) and self-test failed (flashing red). Other color schemes or systems of signaling might be utilized without departing from the invention.

Figure 4:
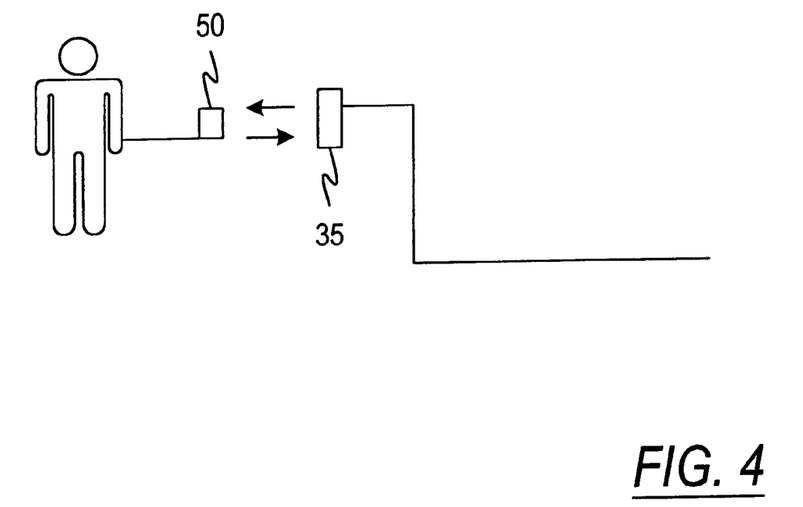
FIG. 4 is a simplified diagram showing communications with the arc fault detection system using a wireless, line of sight form of communication device.

As indicated in FIG. 4, the LED or similar optical device can also be used in connection with a hand-held or other type of communications unit or device 50 to communicate a variety of types of information, in addition to the human perceptible visual information described above. This information might be conveyed in a form of a human imperceptible pulsing or flickering of the LED in place of, in addition to, the user perceptible indications described above. While not human perceptible, this higher frequency pulsing of the LED would be readable by the hand-held or other communications unit 50. Any desired communications protocol could be used in this connection, as well as proprietary communications protocols. Information communicated might include information such as the times since the last trip, the present current level, power consumption, voltage level, reason for tripping and the like. The condition, standby, trip, and self-test pass/fail could additionally be communicated in this protocol, instead of, or in addition to, the visual indications described above.

In addition, the hand-held communication device 50 could contain an information sending device, in similar form to the above-described LED or other device for communicating information to the communications port 35. In this embodiment, the communications port 35 would include a receiving device similar to that used in the hand-held communications device, such that both the communications port 35 and hand-held communications device 50 are capable of bi-directional communications. The communication line 45 would then operate as a bi-directional communication line or linkage with the micro-controller 40 (see FIG. 3) or other control element of the AFCI 25.

Information which might be communicated to the AFCI 25 or its controller 40 includes commands to perform various functions, such as a self-test routine. Other information which might be communicated includes commands to enable or disable the trip function as required for various loads or conditions, or information/data for updating or modifying the trip algorithm. Such updates or modifications might vary the fashion in which the AFCI 25 and/or its micro-controller 40 produce a trip signal, or make the decision to produce a trip signal, based on the monitored conditions in the circuit being monitored by the AFCI 25. These algorithm updates/modifications might be in the form of software codes or data, or the like. Cooperatively, in this regard, the micro-controller could contain one or more programmable memory components for receiving such updated information, as will be described further below. Alternatively, the micro-controller could be preprogrammed with multiple trip algorithms for use in different situations, with the communications device 50 passing a control signal to the communications port 35 for selecting one of these algorithms for use in a particular situation.

Figure 5:
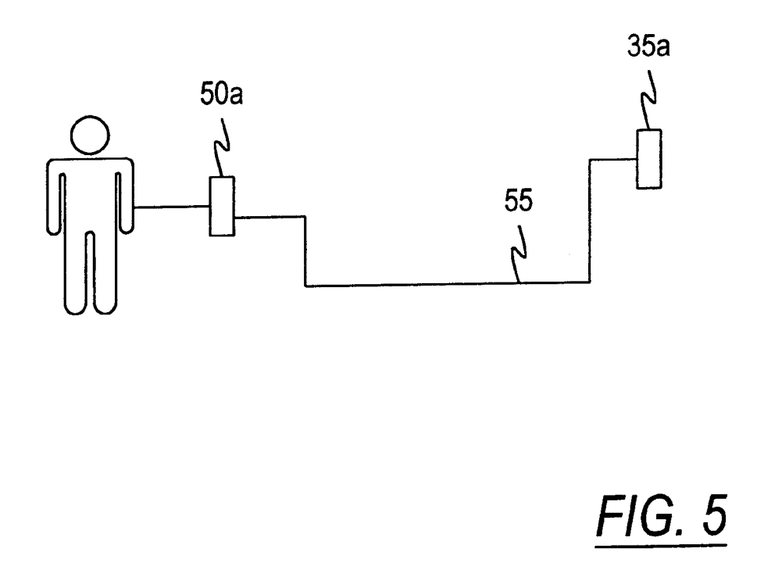
FIG. 5 is a simplified diagram showing communications with an arc fault detection system through the associated power circuit using X-10 or similar protocol.
Figure 8:
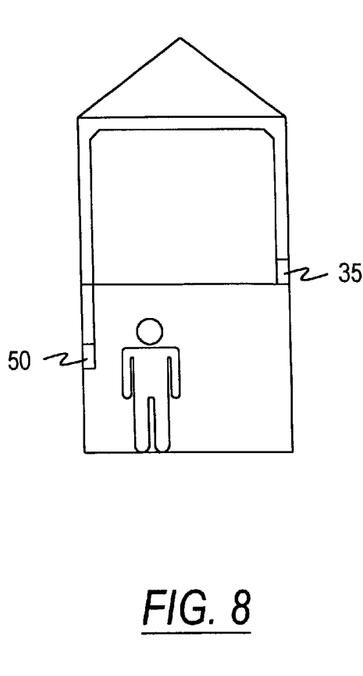
FIG. 8 is a simplified diagram showing communications with an arc fault detection device using an X-10 or similar protocol transmitter.

Referring to FIG. 5, an alternative embodiment of the above-described communications arrangement is indicated. In FIG. 5, the communications port 35a and hand-held or other control or communications unit 50a communicate via a wired connection 55. The wire 55 could comprise a power wire, with an X-10 communication protocol being used to communicate between the port 35a and the device 50a. Referring also to FIG. 8, in this embodiment, the user could communicate with the port 35a using X-10 protocol by plugging the communication device 50a into any outlet which is on the same circuit 12 which is being monitored by the AFCI 25.

Figure 6:
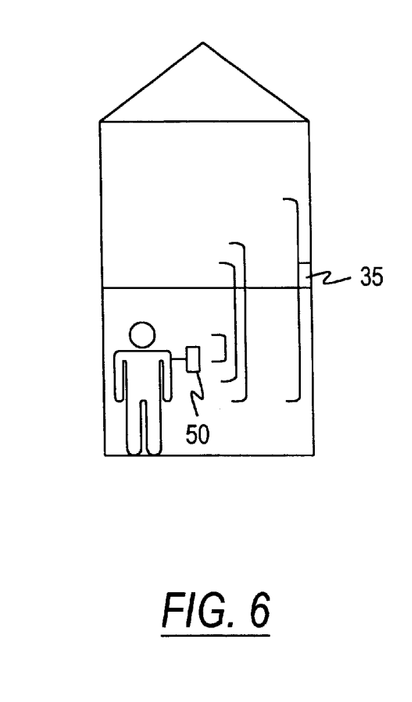
FIG. 6 is a simplified diagram showing communications with an arc fault detection unit using a radio frequency transmitter.
Figure 7:
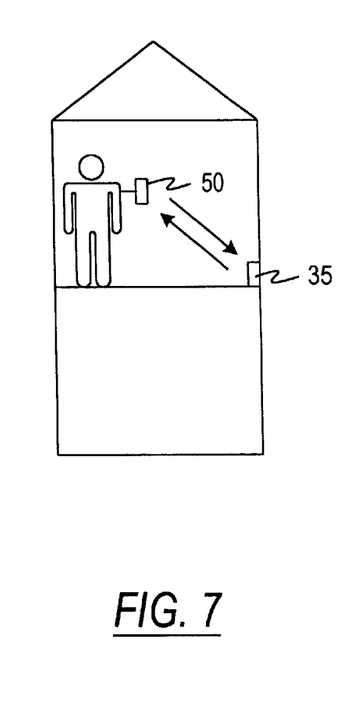
FIG. 7 is a simplified diagram showing communications with the arc fault detection device using an infrared transmitter.

Yet other forms of communication which might be utilized to communicate information between the port 35 and a control unit 50 include radio frequency as indicated in FIG. 6 and infrared (IFR) as indicated in FIG. 7. The IFR scheme would operate similarly to the LED-based scheme described above, in that the LEDs used could emit energy in either or both of the visible and infrared portions of the spectrum.

In addition to the remote activation of the self-test function as described above in connection with the communications port 35 and control unit 50, the AFCI 25 can also contain either a software or hardware routine for automatically performing a self-test at regular intervals, or otherwise, at desired times. The communications port, a separate visual link or indicator (e.g. LED), or other means may be used if desired to provide a suitable indication of whether the unit has passed or failed the self-test routine.

Referring now again to FIG. 3, the arcing fault detector or AFCI may also include a memory for retaining items of the information which are to be communicated over the communication port 35. This memory may be "on-board" or a part of the micro-controller unit 40. Alternatively, an outboard memory 75 (FIG. 3) may be utilized, either alone or in combination with an on-board memory. This memory could also be used for remembering previous load characteristics so as to permit adjustment of the tripping algorithm as appropriate to accommodate such loads while still avoiding nuisance trips. The various types of loads stored in memory could further be retained for readout at a desired time by a hand-held unit or other user communications device by way of the communication port as described above. This would further enable the user to monitor what types of loads are being used on the arcing fault protected circuit. Moreover, the memory permits adjustments to the algorithm to increase sensitivity, for example, if desired for a particular application, for a period of time after the power up sequence following a trip, by storing in memory previous trips which have occurred over some previous time interval.

In order to retain any contents of memory during a power outage, for example when the circuit 12 has been tripped by the AFCI, some additional backup power such as backup power unit 65 may be provided (see FIG. 3). In this regard, it will be recognized that the primary power supply 55 for the micro-controller and other circuits 30 would normally be obtained from the line 12 being monitored, as indicated in FIG. 3. Thus, when the AFCI trips or interrupts current in this line, power to these components will be lost, until a suitable reset element, for example of the type described below, or of some other type, can be safely activated. Should the trip condition continue for some period of time, some backup power source for the memory can be provided, as indicated for example at reference numeral 65. This may comprise a battery backup or other devices, e.g., a charged capacitor or the like.

Thus, with a battery or other power backup, when the circuit has been tripped and power has been cut, the AFCI can continue to communicate via the communication port (e.g. 35) as described above. In addition, problems attendant with startup transients in power supplies when the circuit is reenergized and the power supply 55 is brought back up could be avoided, by maintaining the micro-controller and other circuitry on the backup power source 65 until the power supply 55 reaches a stable condition. In this regard, a relatively short amount of time may be allotted to the AFCI to successfully trip the circuit following a startup. This time requirement can require relatively expensive or inefficient power supply designs in some instances, which can be avoided by the use of the backup power unit 65.

Figure 9:
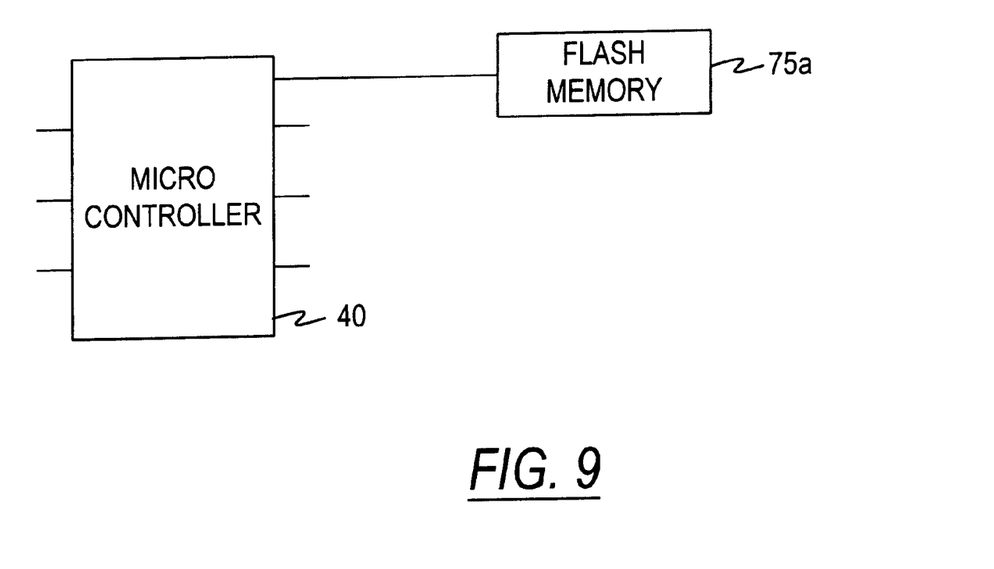
FIG. 9 is a simplified partial block diagram showing an alternate memory to that shown in FIG. 3.
Figure 10:
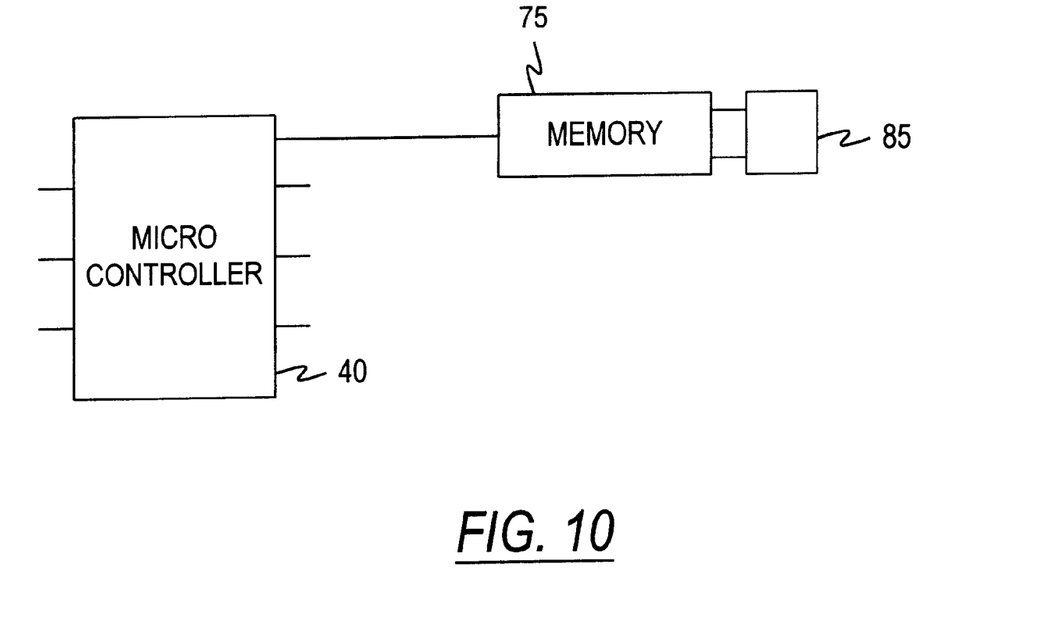
FIG. 10 is a simplified partial block diagram showing an alternate memory to that shown in FIG. 3.

Referring now to FIGS. 9 and 10, alternative methods of retaining memory during power outage are illustrated. In FIG. 9, the memory unit comprises a flash type memory 75a which would retain memory contents and during a power loss due to a trip or otherwise, or some other form of alterable, non-volatile memory. The flash memory 75a might be utilized in combination with use of the backup power source 65 (see FIG. 3) for the micro-controller 40, to assure that communication port operation continues during the power outage. In FIG. 9, a separate power backup 85 for the memory 75 is illustrated, which could be provided either alone or in combination with the backup power source 65 for the micro-controller 40 as described above. The backup power source 85 could be a battery, a capacitor or other power source. Of course, the single backup power source 65 could be used for both the memory 75 and the microcontroller 40, as already indicated above.

Figure 11:
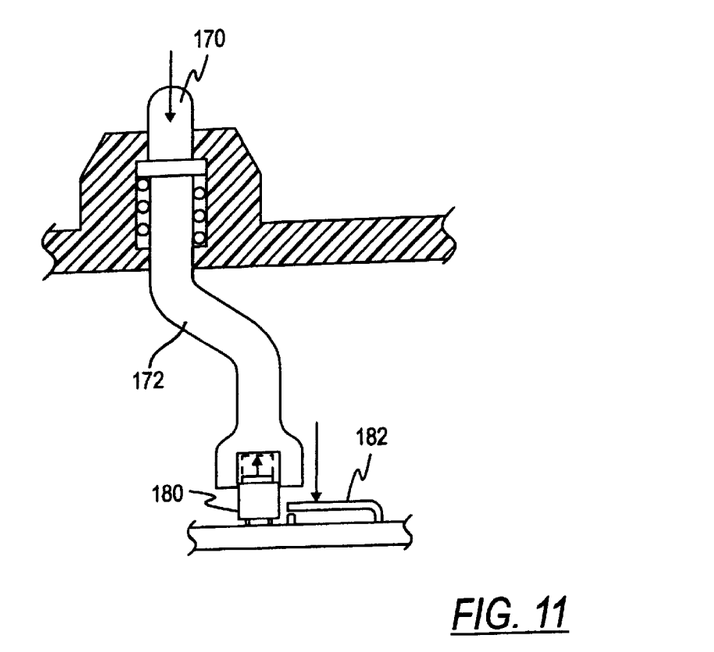
FIG. 11 is a partial sectional view of one embodiment of a combined test and reset button for an AFCI in accordance with one embodiment of the invention.
Figure 12:
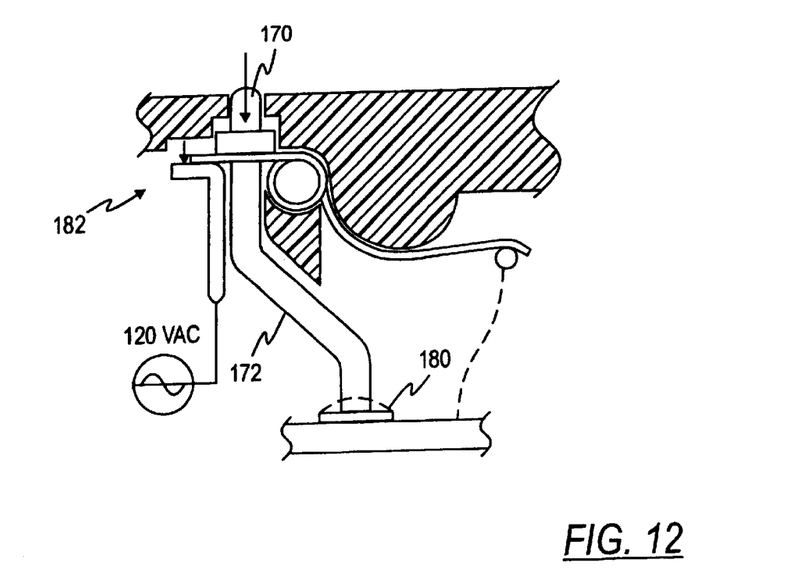
FIG. 12 is a partial sectional view similar to FIG. 8 of an alternative embodiment of a combined test and reset button.
Figure 13:
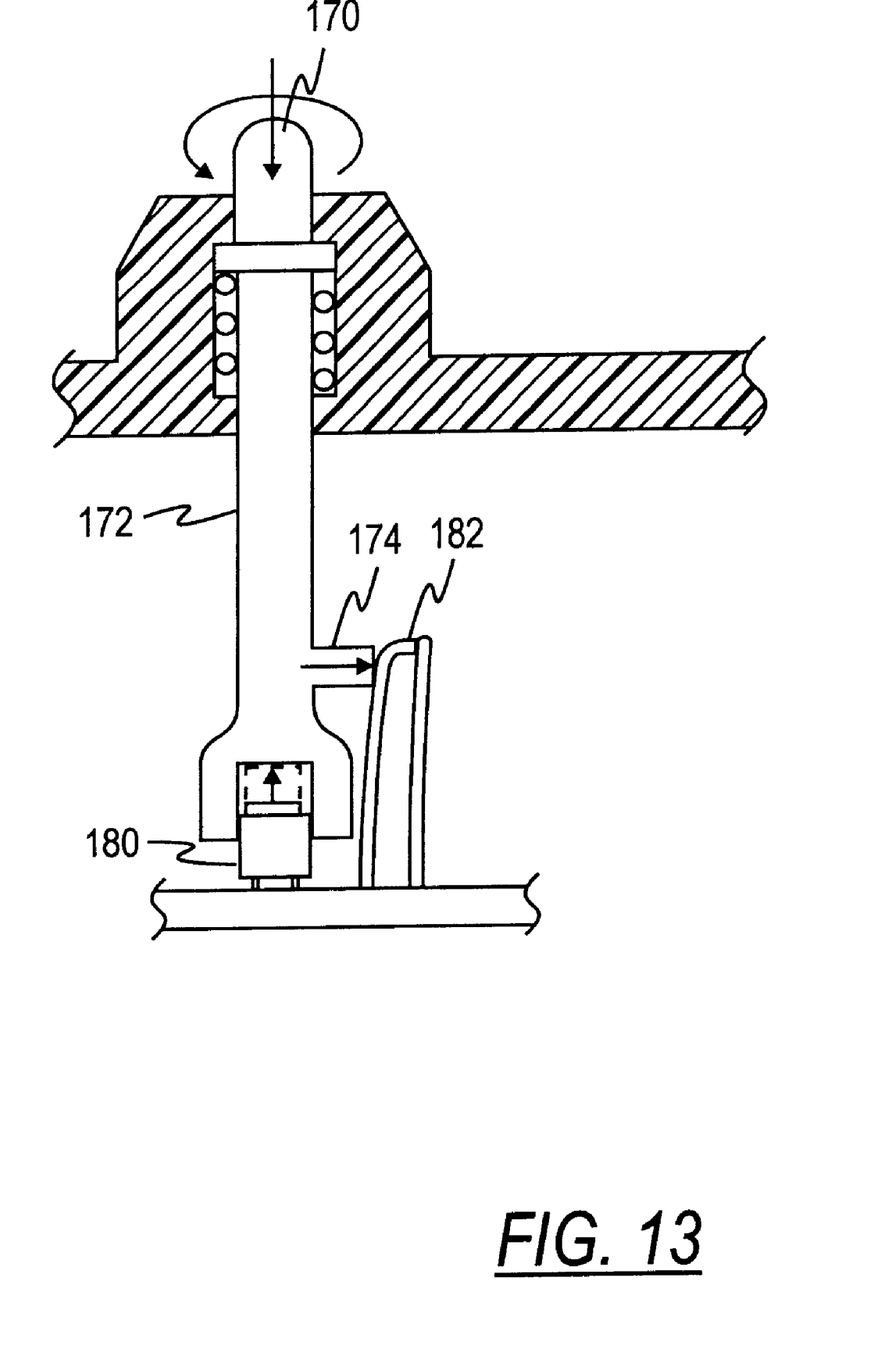
FIG. 13 is a partial sectional view of yet another embodiment of a combined test and reset feature.

Referring now to FIGS. 11–13, various embodiments for a combined push to test and reset control element or button which may alternatively be provided on the AFCI device 25 are shown. This push to test/reset button would be manually activated by a user, either in place of, or in addition to the other various forms of communications with the AFCI device as described above.

Referring now to FIGS. 11 and 12, a combined reset button and test switch are illustrated. The combined reset button and test switch may include a slightly projecting, spring loaded, manually depressible element such as a push button or dome member 170.

The LED or other light emitting device may be incorporated in the dome or push button member 170 which may be translucent to permit viewing of an LED or other indicator. Alternately, an elongated light tube 172 may be utilized, as indicated in FIG. 11, and the LED or other indicator device (e.g., of a communication port 35 as described above) may be incorporated in a separate push button switch element 180 which may also function as a reset switch. Hence, the light from the LED incorporated in the reset button or switch 180 emanates up the light tube 172 to the manually activatable element or dome 170. The light tube 172 is further shaped or contoured at its inner end to simultaneously activate both the reset switch or button 180 and a push-to-test switch 182. In order to distinguish between activation of the two elements or switches 180 and 182, a time delay circuit (not shown) may be included within the AFCI circuitry or implemented in software in the controller 40, such that a initial depression of the push button 170 will enable the signal from the reset switch 180 only, while a continued depression for a predetermined period of time will disable the reset switch and enable the push-to-test switch 182, or vice-versa.

FIG. 12 shows a similar embodiment with the mechanical details varied somewhat. The spring loaded push-button 170 may mount the indicated LED or receive light therefrom through a light tube 172, similar to the embodiment of FIG. 11.

In FIG. 13, the dome or other manually activatable element 170 is spring loaded for push-to-reset operation relative to a switch 180. The manually activatable element or dome 170 is further rotatable as indicated by the arrows to rotate an activating element 174 into and out of engagement with the push-to-test switch 182. Thus, different manipulations of the same element 170 may alternately be used to activate the reset function or the push-to-test function. The dome 170 may hold an LED or the LED may be part of switch 180 and viewed through tube 172 as described above.

It will be appreciated that in the embodiments of FIGS. 11–13, the identities of the reset switch and push-to-test switch may be reversed without departing from the invention. Also, other mechanical schemes for combining push-to-test and reset functions in a single operator manipulated control button or other control element may be utilized without departing from the invention. Moreover, the simultaneous activation of both switches (by both pushing and twisting the element 170 in FIG. 13) may be interpreted as only one of the reset or push-to-test functions, such as by implementing a time delay as described above, or by other means. Alternately, the activation element 170 of FIG. 13 may be mechanically configured with a torsion spring or the like which tends to hold the element 174 biased to a condition away from activation of the switch 182. This might be such that the element 174 cannot be maintained in contact with the switch 182 when the button 170 is depressed, and/or will disengage prior to depression or activation of the switch 180.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. An arc fault circuit interrupter system for use with an electrical circuit, comprising:
    an arc fault circuit interrupter;
    an arcing fault detector which monitors said electrical circuit and a controller which generates a trip signal for the arc fault circuit interrupter in response to the detection of arcing faults;
    said controller also generating one or more communication signals corresponding to information relating to the operation of the arc fault circuit interrupter;
    a communication port which communicates to a user said information relating to operation of the arc fault circuit interrupter in response to said communication signals;
    wherein said arcing fault detector includes a sensor which detects a current in said electrical circuit and develops a corresponding sensor signal, a circuit which determines the presence of broadband noise in said sensor signal and produces a corresponding output signal, and wherein said controller processes said sensor signal and said output signal in a predetermined fashion to determine whether an arcing fault is present in said electrical circuit, and
    wherein the information relating to operation includes information corresponding to a standby condition, a tripped condition, at least one of a self-test passed condition and a self-test failed condition, the time elapsed since the last trip, at least one of the present current level, the present voltage level and the power consumption, and the reason for tripping.

2. The system of claim 1 wherein said communication port comprises a radio frequency device.

3. A system of claim 1 wherein said communication port comprises an infrared radiating device.

4. The system of claim 1 wherein said communication port comprises a port configured for communicating said information via said electrical circuit utilizing a predetermined communication protocol.

5. The system of claim 1 wherein said communication port comprises a light emitting device.

6. The system of claim 5 wherein said controller is adapted to cause said light emitting device to emit light in such a fashion that the light is visually perceived by a human observer as being steadily on or flashing on and off.

7. The system of claim 5 wherein said light emitting device comprises a bi-color light emitting diode.

8. The system of claim 7 wherein said controller is adapted to cause said light emitting diode to emit light in such a fashion that the light is visually perceived by a human observer as being steadily on or flashing on and off.

9. The system of claim 5 wherein said communication signal comprises information in a selected data format which causes said light emitting device to pulsate at a human imperceptible rate.

10. The system of claim 1 and further including an operator control unit, and wherein said communication port is adapted for bi-directional exchange of information with said operator control unit.

11. The system of claim 1 and further comprising a reset switch and a self-test activating switch, and a single user-accessible control element adapted to selectively activate one or both of said reset switch and said self-test switch.

12. The system of claim 11 wherein said communication port comprises a light-emitting device, and wherein said user accessible control element includes a translucent portion arranged for permitting transmission of a light from said light emitting device therethrough.

13. The system of claim 1 and further including a memory for retaining predetermined information related to the operation of the arc fault circuit interrupter, said memory being operatively coupled with said controller.

14. The system of claim 13 wherein said memory comprises an on board controller memory.

15. The system of claim 13 wherein said memory is outboard and operatively coupled with said controller.

16. The system of claim 15 wherein said memory comprises a flash memory.

17. The system of claim 13 wherein said controller is adapted to store in said memory predetermined information regarding previous loads and previous tripping events, and to adjust a tripping algorithm which controls tripping, in accordance with the contents of said memory regarding previous loads and previous tripping events.

18. The system of claim 13 wherein said controller is adapted to control an exchange of information between said memory and said communication port.

19. The system of claim 13 and further including a backup power source for said memory.

20. The system of claim 13 and further including a backup power source for said controller.

21. The system of claim 13 and further including a backup power source for said controller and said memory.

22. An arc fault circuit interrupter system for use with an electrical circuit, comprising:
    an arc fault circuit interrupter;
    an arcing fault detector which monitors said electrical circuit and a controller which generates a trip signal for the arc fault circuit interrupter in response to the detection of arcing faults;
    a memory for retaining predetermined information related to the condition and operation of the arc fault circuit interrupter, said memory being operatively coupled with said controller;
    wherein said arcing fault detector includes a sensor which detects a current in said electrical circuit and develops a corresponding sensor signal, a circuit which determines the presence of broadband noise in said sensor signal and produces a corresponding output signal, and wherein said controller processes said sensor signal and said output signal in a predetermined fashion to determine whether an arcing fault is present in said electrical circuit; and
    wherein the information relating to operation includes information corresponding to a standby condition, a tripped condition, at least one of a self-test passed condition and a self-test failed condition, the time elapsed since the last trip, at least one of the present current level, the present voltage level and the power consumption, and the reason for tripping.

23. The system of claim 22 wherein said controller also generates one or more communication signals corresponding to information relating to the operation of the arc fault circuit interrupter, further including a communication port which communicates to a user said information relating to operation of the arc fault circuit interrupter in response to said communication signals.

24. The system of claim 23 herein said controller is adapted to control the exchange of information between said memory and said communication port.

25. The system of claim 22 wherein said memory comprises an on-board controller memory.

26. The system of claim 22 wherein said memory is outboard of, and operatively coupled with, said controller.

27. The system of claim 26 wherein said memory comprises a flash memory.

28. The system of claim 22 wherein said controller is adapted to store in said memory predetermined information regarding previous loads and previous tripping events, and to adjust a tripping algorithm which controls tripping, in accordance with the contents of said memory regarding previous loads and previous tripping events.

29. The system of claim 22 and further including a backup power source for said memory.

30. The system of claim 22 and further including a backup power source for said controller.

31. The system of claim 22 and further including a backup power source for said controller and said memory.

32. A method of arc fault circuit interruption for use with an electrical circuit, comprising:
    monitoring said electrical circuit for arcing faults and generating a trip signal in
    response to the detection of arcing faults;
    generating one or more communication signals corresponding to information relating to the operation of apparatus for carrying out the arcing fault circuit interruption;
    communicating to a user via a communications port said information relating to operation of said apparatus in response to said communication signals;
    wherein said monitoring includes detecting a current in said electrical circuit and developing a corresponding sensor signal, determining the presence of broadband noise in said sensor signal and producing a corresponding output signal, and processing said sensor signal and said output signal in a predetermined fashion to determine whether an arcing fault is present in said electrical circuit; and
    wherein the information relating to operation includes information corresponding to a standby condition, a tripped condition, at least one of a self-test passed condition and a self-test failed condition, the time elapsed since the last trip, at least one of the present current level, the present voltage level and the power consumption, and the reason for tripping.

33. The method of claim 32 wherein said communicating uses radio frequency signals.

34. The method of claim 32 wherein said communicating uses infrared signals.

35. The method of claim 32 wherein said communicating uses a predetermined communication protocol.

36. The method of claim 32 wherein said communicating uses light signals.

37. The method of claim 36 wherein said communicating comprises emitting light signals which pulsate at a human imperceptible rate.

38. The method of claim 32, said communicating including bi-directional exchange of information with an operator control unit.

39. The method of claim 32 and further including a user activating a single user-accessible control element to selectively activate one or both of a reset switch and a self-test switch.

40. The method of claim 32 and further including retaining in a memory predetermined information related to the condition and operation of the apparatus for carrying out arcing fault circuit interruption.

41. The method of claim 40 and further including providing backu power for said memory.

42. The method of claim 32 including storing in a memory predetermined information regarding previous loads and previous tripping events, and adjusting a tripping algorithm which controls tripping in accordance with the contents of said memory regarding previous loads and previous tripping events.

43. A method of arc fault circuit interruption for use with an electrical circuit, comprising:
    monitoring said electrical circuit and generating a trip signal in response to the detection of arcing faults;
    retaining in a memory predetermined information related to the condition and operation of apparatus for carrying out the arcing fault circuit interruption,
    wherein said monitoring includes detecting a current in said electrical circuit and developing a corresponding sensor signal, determining the presence of broadband noise in said sensor signal and producing a corresponding output signal, and processing said sensor signal and said output signal in a predetermined fashion to determine whether an arcing fault is present in said electrical circuit; and wherein the information relating to operation includes information corresponding to a standby condition, a tripped condition, at least one of a self-test passed condition and a self-test failed condition, the time elapsed since the last trip, at least one of the present current level, the present voltage level and the power consumption, and the reason for tripping.

44. The method of claim 43 and further comprising a user selectively activating a single user-accessible control element adapted to activate one or both of a reset switch and a self-test switch.

45. The method of claim 43 wherein said retaining includes storing in said memory predetermined information regarding previous loads and previous tripping events, and adjusting a tripping algorithm which controls tripping, in accordance with the contents of said memory regarding previous loads and previous tripping events.

* * * * *